(12) United States Patent
Nagamine et al.

(10) Patent No.: US 9,534,957 B2
(45) Date of Patent: Jan. 3, 2017

(54) UNEVENNESS INSPECTION APPARATUS AND UNEVENNESS INSPECTION METHOD

(71) Applicant: SONY CORPORATION, Tokyo (JP)

(72) Inventors: Kunihiko Nagamine, Kanagawa (JP); Satoshi Tomioka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/511,464

(22) Filed: Oct. 10, 2014

(65) Prior Publication Data

US 2015/0022672 A1  Jan. 22, 2015

Related U.S. Application Data

(62) Division of application No. 13/523,546, filed on Jun. 14, 2012, now Pat. No. 8,885,052.

(30) Foreign Application Priority Data

Jun. 21, 2011 (JP) ................................. 2011-136930
Apr. 26, 2012 (JP) ................................. 2012-101419

(51) Int. Cl.
*G01J 3/50* (2006.01)
*G01J 3/46* (2006.01)
*H04N 17/02* (2006.01)

(52) U.S. Cl.
CPC ................ *G01J 3/506* (2013.01); *G01J 3/462* (2013.01); *H04N 17/02* (2013.01)

(58) Field of Classification Search
None
See application file for complete search history.

(56) References Cited

U.S. PATENT DOCUMENTS

| 6,885,369 B2 | 4/2005 | Tanahashi et al. |
| 8,520,077 B2 | 8/2013 | Nagamine et al. |
| 2011/0096191 A1 | 4/2011 | Nagamine et al. |

FOREIGN PATENT DOCUMENTS

| CN | 102054175 A | | 5/2011 |
| JP | H01-225296 | | 9/1989 |
| JP | 10-002800 | | 1/1998 |
| JP | H10-096681 | | 4/1998 |
| JP | H10-096681 A | | 4/1998 |
| JP | 2001-028059 A | | 1/2001 |
| JP | 2003-057146 | | 2/2003 |
| JP | 2005-043174 A | | 2/2005 |
| JP | 2003-057146 | * | 2/2006 |
| JP | 2006-119073 A | | 5/2006 |
| JP | 2007-198850 A | | 8/2007 |
| JP | 2011-95061 A | | 5/2011 |

* cited by examiner

*Primary Examiner* — Michael Teitelbaum
(74) *Attorney, Agent, or Firm* — Oblon, McClelland, Maier & Neustadt, L.L.P.

(57) ABSTRACT

An unevenness inspection apparatus including: an image pickup section obtaining a pickup image of a test object; an image generating section generating each of a color unevenness inspection image and a luminance unevenness inspection image based on the pickup image; a calculating section calculating an evaluation parameter using both of the color unevenness inspection image and the luminance unevenness inspection image; and an inspecting section performing unevenness inspection using the calculated evaluation parameter. The calculating section calculates the evaluation parameter in consideration of unevenness visibility for both color and luminance.

11 Claims, 11 Drawing Sheets

AREA RATIO OF COLOR UNEVENNESS REGION FOR EACH COLOR GROUP

MAXIMUM CHROMA Cmax

FIG. 5A (D11)
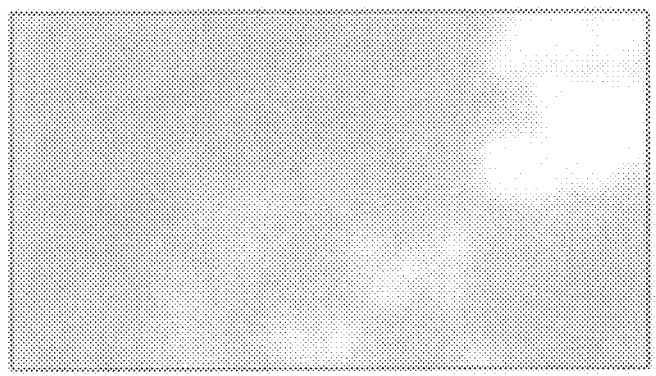
FIG. 5B (D12)
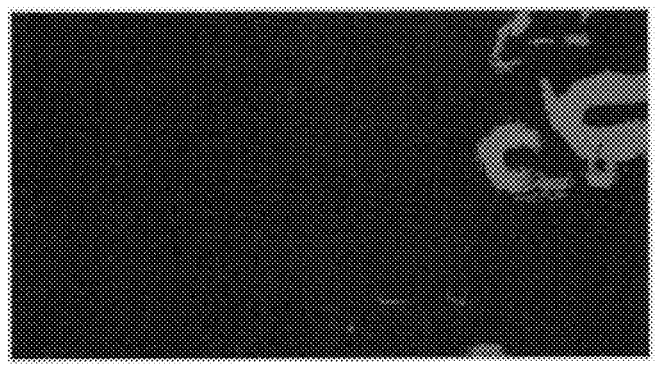
FIG. 5C (D13)
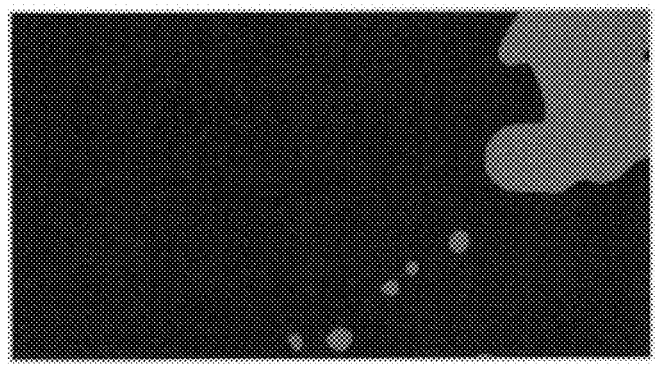
FIG. 5D CALCULATION OF MAXIMUM CHROMA Cmax
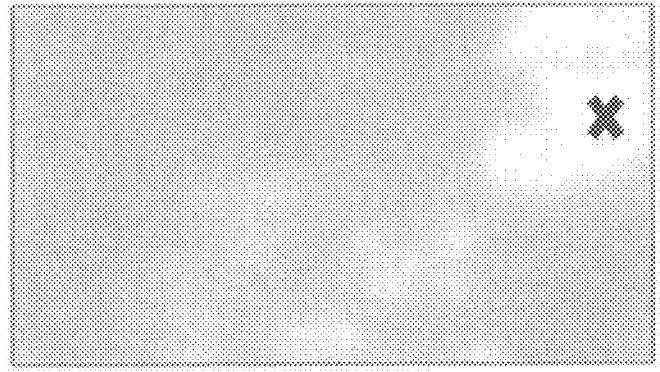

FIG. 7A (D21)
FIG. 7B (D22)
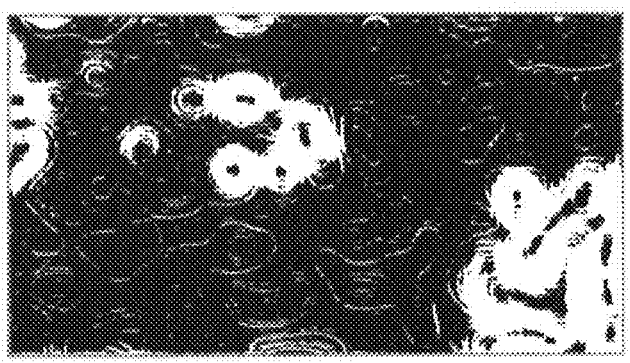
FIG. 7C (D23)
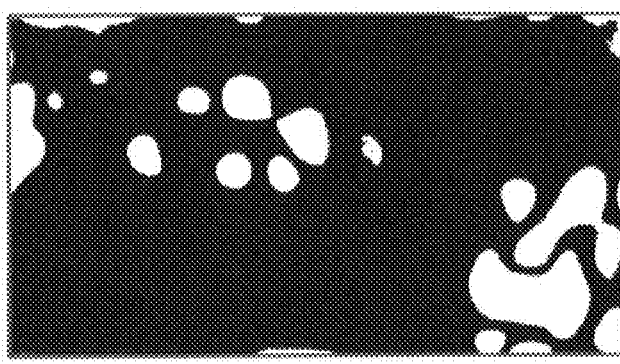
FIG. 7D CALCULATION OF MAXIMUM LUMINANCE DIFFERENCE $\Delta L^*max$
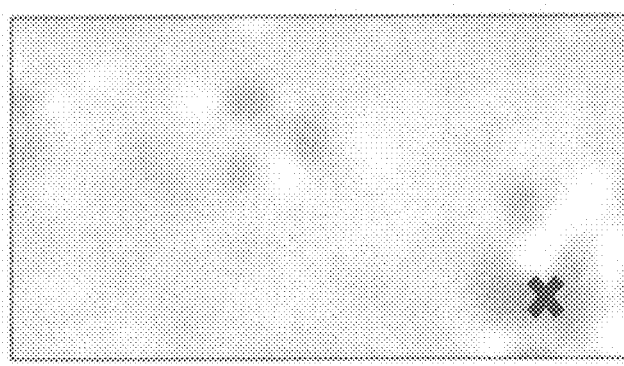

| DISPLAY SCREEN SIZE[inch] | APPROPRIATE VIEWING DISTANCE [mm] | VIEWING ANGLE PER 1mm[°] |
|---|---|---|
| 8 | 300 | 0.190 |
| 40 | 1500 | 0.038 |
| 80 | 3000 | 0.019 |

| APPROPRIATE VIEWING DISTANCE (DISPLAY SCREEN SIZE) | LUMINANCE EDGE IMAGE (D22) (LUMINANCE EDGE THRESHOLD VALUE:dL*/mm=0.5) | LUMINANCE EDGE IMAGE (D22) (LUMINANCE EDGE THRESHOLD VALUE:dL*/arcmin=0.218) |
|---|---|---|
| 300 [mm] (8 [inch]) |  |  |
| 1500 [mm] (40 [inch]) |  | 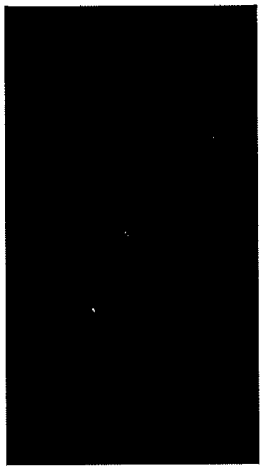 |
| 3000 [mm] (80 [inch]) |  |  |
FIG. 10

| DISPLAY SCREEN SIZE[inch] | APPROPRIATE VIEWING DISTANCE[mm] | PITCH FOR VIEWING ANGLE OF 1° [mm] | PITCH FOR VIEWING ANGLE OF 1' [mm] | PITCH FOR 0.1rad[mm] |
|---|---|---|---|---|
| 8 | 300 | 5.2 | 0.087 | 30.1 |
| 40 | 1500 | 26.2 | 0.436 | 150.5 |
| 80 | 3000 | 52.4 | 0.873 | 301.0 |

(0.1[rad] ≒ 5.73[°])

FIG. 11

UNEVENNESS INSPECTION APPARATUS AND UNEVENNESS INSPECTION METHOD

CROSS REFERENCE TO RELATED APPLICATIONS

This application is a Divisional Application of U.S. patent application Ser. No. 13/523,546 filed on Jun. 14, 2012, which claims priority from Japanese Priority Patent Application JP 2011-136930 filed in the Japan Patent Office on Jun. 21, 2011, and Japanese Priority Patent Application JP 2012-101419 filed in the Japan Patent Office on Apr. 26, 2012. Each of the above referenced applications is hereby incorporated by reference in its entirety.

BACKGROUND

The present disclosure is related to an unevenness inspection apparatus and an unevenness inspection method for carrying out an unevenness inspection (color unevenness inspection and luminance unevenness inspection) in color images and the like.

In the past, a color unevenness or a luminance unevenness inspection in mass production lines of display units using CRTs (Cathode Ray Tubes), LCDs (Liquid Crystal Displays), and the like that are allowed to display color images has been mainly performed utilizing a sensory test based on a comparison with a limit sample. This technique, which is achieved in such a manner that a display screen on a display unit targeted for inspection is directly viewed by a human, provides an inspection similar to actual status of use, and a simple testing method.

However, such a technique depends mostly on the ability of an individual inspecting staff, and thus the inspection quality is influenced by a individual difference among inspecting staffs or a fatigue level of an inspecting staff, which makes it difficult to assure a stable inspection.

To deal with such an issue, several objective color unevenness inspection techniques that are independent of the ability of an individual inspecting staff have been proposed. Examples of such a technique include a technique wherein the hue in a plurality of locations within a display screen is measured using color image pickup device and the like with an overall display screen set up in a white-color display state to carry out a color unevenness inspection according to a magnitude relation of values of a maximum color difference from that of white-color display portions ($\Delta$ Euv* or $\Delta$ Eab*).

In concrete terms, for example, Japanese Unexamined Patent Application Publication Nos. 1989-225296, 1998-2800, and 2003-57146 measure the color and brightness in several locations within a display screen, and standardize a variation or a difference from a maximum value and a minimum value for use in the color unevenness inspection. Further, for example, Japanese Unexamined Patent Application Publication No. 1998-96681 pays attention to a spatial size of a color unevenness region or a color-varying region, quantifying these for use in the color unevenness inspection. In addition, for example, Japanese Unexamined Patent Application Publication No. 2007-198850 proposes a technique to evaluate a luminance unevenness for each luminance data of R (red), G (green), and B (blue).

SUMMARY

However, in the techniques proposed in Japanese Unexamined Patent Application Publication Nos. 1989-225296, 1998-2800, and 2003-57146, it is possible to expect the achievement of a stable inspection by employing an objective color unevenness inspection using standardized parameters, although those techniques are disadvantageous in that a degree of the color unevenness that a human perceives may vary depending on a way how the color unevenness spreads. Further, also in the technique proposed in Japanese Unexamined Patent Application Publication No. 1998-96681, there is a disadvantage that a degree of the color unevenness that a human perceives may vary depending on the hue. In addition, the technique proposed in Japanese Unexamined Patent Application Publication No. 2007-198850 attempts to evaluate the unevenness in a case where both of the luminance unevenness and the color unevenness occur at the same time, although it gives no consideration on a human perception for the luminance unevenness and the color unevenness. Therefore, this technique does not lead to a comprehensive unevenness evaluation method in accurately evaluating the quality of a display unit.

In other words, with existing techniques, it is difficult to carry out a proper unevenness inspection (color unevenness inspection and luminance unevenness inspection) due to a human visibility for the color unevenness or the luminance unevenness, leaving room for improvement.

It is desirable to provide a unevenness inspection apparatus and a unevenness inspection method that enable a more appropriate unevenness inspection as compared with existing techniques.

An unevenness inspection apparatus according to an embodiment of the present disclosure includes: an image pickup section obtaining a pickup image of a test object; an image generating section generating each of a color unevenness inspection image and a luminance unevenness inspection image based on the pickup image; a calculating section calculating an evaluation parameter using both of the color unevenness inspection image and the luminance unevenness inspection image; and an inspecting section performing unevenness inspection using the calculated evaluation parameter. The calculating section calculates the evaluation parameter in consideration of unevenness visibility for both color and luminance.

An unevenness inspection method according to an embodiment of the present disclosure includes: obtaining a pickup image of a test object; generating each of a color unevenness inspection image and a luminance unevenness inspection image based on the pickup image; calculating an evaluation parameter using both of the color unevenness inspection image and the luminance unevenness inspection image; and performing unevenness inspection using the calculated evaluation parameter. The calculating the evaluation parameter is performed in consideration of unevenness visibility for both color and luminance.

The unevenness inspection apparatus and the unevenness inspection method according to the embodiments of the present disclosure generate each of the color unevenness inspection image and the luminance unevenness inspection image based on the pickup image of the test object, and calculate the evaluation parameter using both of the color unevenness inspection image and the luminance unevenness inspection image, performing unevenness inspection using the calculated evaluation parameter. The evaluation parameter is calculated in consideration of the unevenness visibility for both of the color and the luminance. As a result, unlike existing techniques carrying out unevenness inspection with disregard for such an visibility, this achieves an objective unevenness inspection (color unevenness inspection and luminance unevenness inspection) that is more consistent with human perception.

The unevenness inspection apparatus and the unevenness inspection method according to the embodiments of the present disclosure calculate the evaluation parameter using both of the color unevenness inspection image and the luminance unevenness inspection image in consideration of the unevenness visibility for both of the color and the luminance. As a result, unlike existing techniques, this allows to achieve objective unevenness inspection that is more consistent with human perception. Consequently, it is possible to carry out more appropriate unevenness inspection as compared with existing techniques.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the present disclosure, and are incorporated in and constitute a part of this specification. The drawings illustrate embodiments and, together with the specification, serve to explain the principles of the present technology.

FIGS. 5A, 5B, 5C, and 5D are each a diagram showing an example of images to be generated for a color unevenness inspection processing.

FIGS. 7A, 7B, 7C, and 7D are each a diagram showing an example of images to be generated for a luminance unevenness inspection processing.

FIG. 10 is a diagram illustrating luminance edge images according to Example 2.

FIG. 11 is a diagram for explaining an effect in a case where the amount of change per unit viewing angle is used as an edge threshold value.

DETAILED DESCRIPTION OF THE PREFERRED EMBODIMENTS

Hereinafter, the embodiments of the present disclosure are described in details with reference to the drawings. It is to be noted that the descriptions are provided in the order given below.

Figure 1:
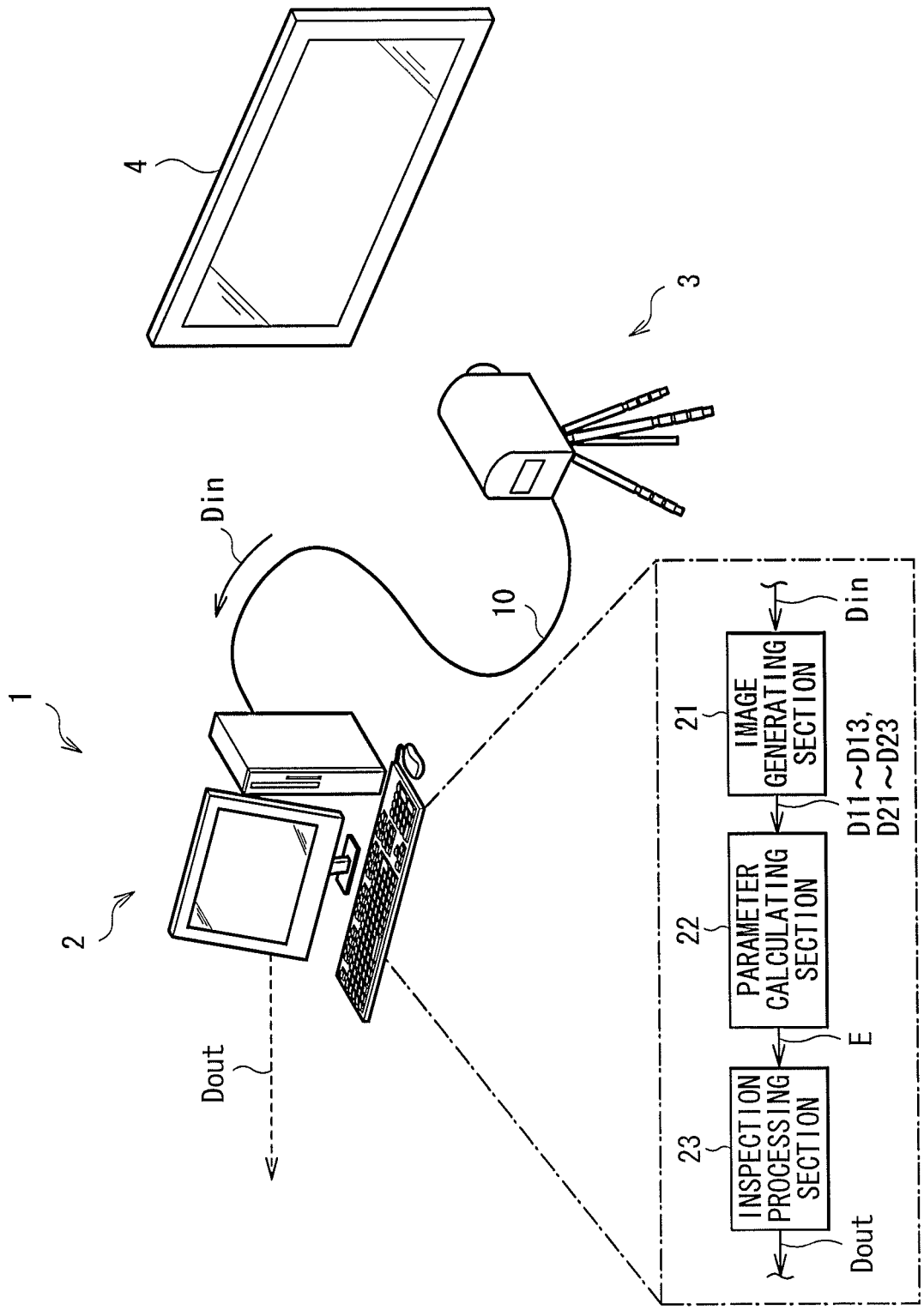
FIG. 1 is a diagram showing a simplified configuration of a unevenness inspection apparatus according to an embodiment of the present disclosure with a display unit targeted for inspection.

1. Embodiments of the present disclosure (an example where a unevenness inspection is carried out in consideration of the unevenness visibility for both of the color and the luminance)
2. Modification example Embodiments of the Present Disclosure Configuration of Unevenness Inspection Apparatus FIG. 1 shows a simplified configuration of a unevenness inspection apparatus according to an embodiment of the present disclosure (unevenness inspection apparatus 1) together with a display unit 4 targeted for inspection. The unevenness inspection apparatus 1, which is intended to carry out a comprehensive unevenness inspection including a color unevenness inspection and a luminance unevenness inspection for color images displayed on the display unit 4 and the like, has an image processing unit 2 and an image pickup unit 3 (image pickup section). As the display unit 4, a wide variety of displays such as CRT, LCD, PDP (Plasma Display Panel), and organic EL (Electro Luminescence) display may be applicable. It is to be noted that a unevenness inspection method according to an embodiment of the present disclosure is also described hereinafter together with this embodiment because it is embodied with the unevenness inspection apparatus 1 according to this embodiment of the present disclosure.

(Image Pickup Unit 3)
The image pickup unit 3 is intended to take an image on a display screen (color display screen) of the display unit 4 that is targeted for the above-described unevenness inspection. The image pickup unit 3 is configured using image pickup devices including, for example, CCD (Charge Coupled Devices), CMOS (Complementary Metal Oxide Semiconductor), and other elements. A pickup image (image pickup data Din) obtained through image pickup by the image pickup unit 3 is output to the image processing unit 2 via a connection wiring 10. It is to be noted that FIG. 1 shows a case where a wired connection is used for the connection wiring 10, although interconnection may be also made wirelessly between the image pickup unit 3 and the image processing unit 2.

(Image Processing Unit 2)
The image processing unit 2 performs a unevenness inspection based on the image pickup data Din being output from the image pickup unit 3, and outputs inspection result data Dout as its inspection result, being configured using a PC (Personal Computer) or the like as shown in FIG. 1. The image processing unit 2 has an image generating section 21, a parameter calculating section 22 (calculating section), and an inspection processing section 23 (inspecting section).

The image generating section 21 generates each of color unevenness inspection image and luminance unevenness inspection image to be hereinafter described by performing a predetermined image processing operation based on the image pickup data Din. In concrete terms, as the color unevenness inspection image, the image generating section 21 generates each of a color unevenness image (color unevenness image data D11), a chroma edge image (chroma edge image data D12), and a binary color unevenness image (binary color unevenness image data D13) to be hereinafter described. Further, as the luminance unevenness inspection image, the image generating section 21 generates each of a luminance unevenness image (luminance unevenness image data D21), a luminance edge image (luminance edge image data D22), and a binary luminance unevenness image (binary luminance unevenness image data D23) to be hereinafter described. At this time, the image generating section 21 generates the above-described color unevenness inspection image while performing correction processing (gain correction processing to be hereinafter described) in consideration of a difference in the color unevenness visibility depending on colors. It is to be noted that detailed description on image processing (image generation processing) at the image generating section 21 is hereinafter provided.

The parameter calculating section 22 calculates various evaluation parameters for unevenness inspection to be hereinafter described by using both the color unevenness inspection image (various image data D11 to D13 described above) and the luminance unevenness inspection image (various image data D21 to D23 described above) that are generated by the image generating section 21. In particular, a color unevenness evaluation value Ec (color unevenness parameter) to be hereinafter described is calculated with the use of the color unevenness inspection images (various image data D11 to D13). Further, a luminance unevenness evaluation value El (luminance unevenness parameter) to be hereinafter described is calculated with the use of the luminance unevenness inspection images (various image data D21 to D23). Subsequently, by performing weighting addition of the color unevenness evaluation value Ec and the luminance unevenness evaluation value El, a total evaluation value E (total evaluation parameter) as the above-described evaluation parameter is calculated. At this time, according to this embodiment of the present disclosure, the parameter calculating section 22 calculates the total evaluation value E in consideration of the unevenness visibility for both of the color and the luminance. It is to be noted that detailed description on calculation processing at the parameter calculating section 22 is also hereinafter provided.

The inspection processing section 23 uses the total evaluation value E calculated at the parameter calculating section 22 to perform unevenness inspection (comprehensive unevenness inspection including the color unevenness inspection and the luminance unevenness inspection) for the display screen of the display unit 4 that is targeted for the unevenness inspection. With such an arrangement, the inspection result data Dout as its inspection result is output from the inspection processing section 23. It is to be noted that detailed description on unevenness inspection processing at the inspection processing section 23 is also hereinafter provided.

[Operation and Effects of Unevenness Inspection Apparatus]

Subsequently, description is provided on the operation and effects of the unevenness inspection apparatus 1 according to this embodiment of the present disclosure.

(1. Basic Operation)

In this unevenness inspection apparatus 1, when the image pickup unit 3 takes an image on a display screen of the display unit 4 that is targeted for inspection, a pickup image (image pickup data Din) is obtained. This image pickup data Din is input into the image generating section 21 within the image processing unit 2 via the connection wiring 10.

The image generating section 21 generates each of the color unevenness inspection images (various image data D11 to D13) and the luminance unevenness inspection images (various image data D21 to D23) by performing a predetermined image processing operation based on the image pickup data Din. Subsequently, the parameter calculating section 22 calculates the total evaluation value E that is an evaluation parameter for the unevenness inspection using both the color unevenness inspection images and the luminance unevenness inspection images. Thereafter, the inspection processing section 23 uses the total evaluation value E to perform a unevenness inspection for the display screen of the display unit 4 that is targeted for inspection. With such an arrangement, the inspection result data Dout as its inspection result is output from the inspection processing section 23.

(2. Details of Unevenness Inspection Process)

Figure 2:
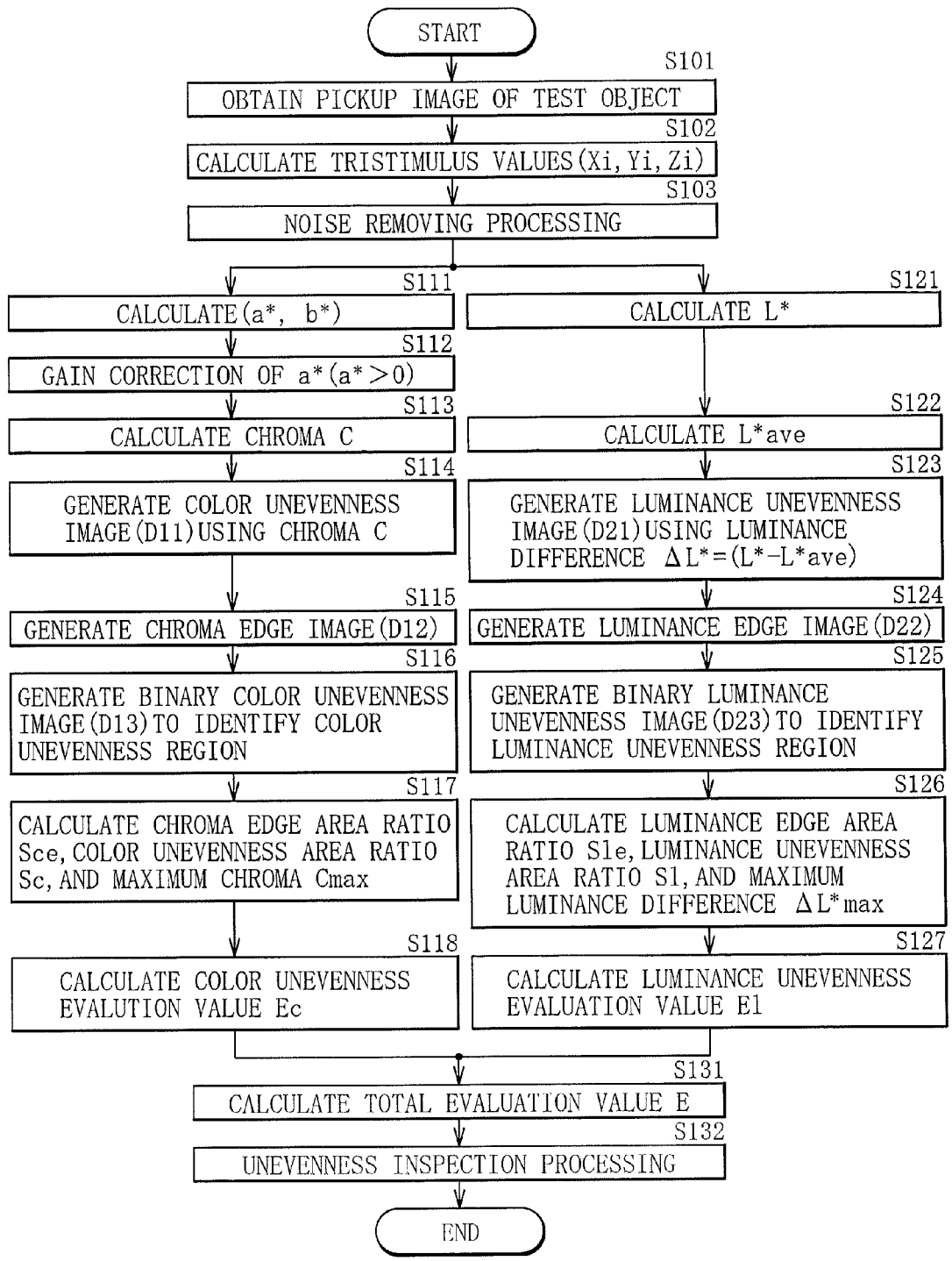
FIG. 2 is a flow chart showing an example of a unevenness inspection process to be performed by an image processing unit illustrated in FIG. 1.

Next, detailed description is provided on a unevenness inspection process by the image processing unit 2 that represents one of the characteristic portions in the unevenness inspection apparatus 1 according to this embodiment of the present disclosure. FIG. 2 shows an example of a unevenness inspection process to be performed by the image processing unit 2 as a flow chart.

(2-1. Preprocessing)

First, as described above, the image generating section 21 obtains a pickup image (image pickup data Din) targeted for inspection via the connection wiring 10 from the image pickup unit 3 (step S101).

Next, the image generating section 21 converts a signal of the image pickup data Din into a (Xi, Yi, Zi) signal including tristimulus values X, Y, and Z (step S102). In concrete terms, for example, if the image pickup data Din is an image signal conforming to the sRGB specifications, a conversion is performed using Expression (1) given below. Further, also for the image signal conforming to any other specifications, the (Xi, Yi, Zi) signal is generated by performing a conversion in accordance with the specifications in a similar manner. It is to be noted that description is here provided on a case where a signal of the image pickup data Din is converted into the (Xi, Yi, Zi) signal, although the (Xi, Yi, Zi) signal may be obtained directly by the image pickup unit 3 alternatively.

When the Din is an image signal conforming to the sRGB specifications (in accordance with IEC 61966-2-1):

$$\begin{bmatrix} Xi \\ Yi \\ Zi \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} RsRGB \\ GsRGB \\ BsRGB \end{bmatrix} \quad (1)$$

Subsequently, the image generating section 21 performs a predetermined noise removing process as a preprocessing for the (Xi, Yi, Zi) signal (step S103). In particular, the image generating section 21 carries out a process to remove noise caused due to types or image pickup conditions of the image pickup unit 3 by using a spatial filter such as Median Filter. In some cases, however, such a noise removing process may be omitted.

(2-2. Calculation of Color Unevenness Evaluation Value Ec)

Next, the image generating section 21 and the parameter calculating section 22 calculate the color unevenness evaluation value Ec in the manner described hereinafter (steps S111 to S118).

In concrete terms, first, the image generating section 21 calculates (a*, b*) that is a value in the CIE 1976 L*a*b* color space (CIELAB color space) recommended in 1976 by CIE (International Commission on Illumination) on the basis of the (Xi, Yi, Zi) signal after being subject to the above-described noise removing process (step S111). It is to be noted that the CIELAB color space is recommended as a uniform color space, representing a space in consideration of the uniformity for a human perception of the color visibility. Here, in particular, the image generating section 21 calculates (a*, b*) for each image pickup pixel (display pixel) by using Expression (2) and Expression (3) given below. It is to be noted that Xn, Yn, and Zn in these expressions are tristimulus values on a complete diffuse reflection plane.

$$\begin{cases} a^* = 500\{(Xi/Xn)^{1/3} - (Yi/Yn)^{1/3}\} \\ b^* = 200\{(Yi/Yn)^{1/3} - (Zi/Zn)^{1/3}\} \end{cases} \quad (2)(3)$$

Thereafter, the image generating section 21 generates various color unevenness inspection images described above while performing a correction processing (gain correction processing) in consideration of a difference in the color unevenness visibility depending on colors. More specifically, the image generating section 21 calculates a chroma C while performing such a correction processing in each image pickup pixel. In concrete terms, first, the image generating section 21 performs a gain correction processing (correction processing using a gain α) expressed by Expression (4) given below as a correction processing in consideration of a difference in the color unevenness visibility for a* calculated in the step S111 (step S112). Subsequently, the image generating section 21 calculates the chroma C for each image pickup pixel with Expression (5) given below using (a*', b*) calculated in the steps S111 and S112 (step S113).

$$a^{*\prime} = (\alpha \times a^*)$$

(For $a^* > 0$: gain $\alpha > 1$; for $a^* = <0$: gain $\alpha = 1$) \quad (4)

$$C = \{(a^{*\prime})^2 + (b^*)^2\}^{1/2} \quad (5)$$
$$= \{(\alpha \times a^*)^2 + (b^*)^2\}^{1/2}$$

Figure 3:
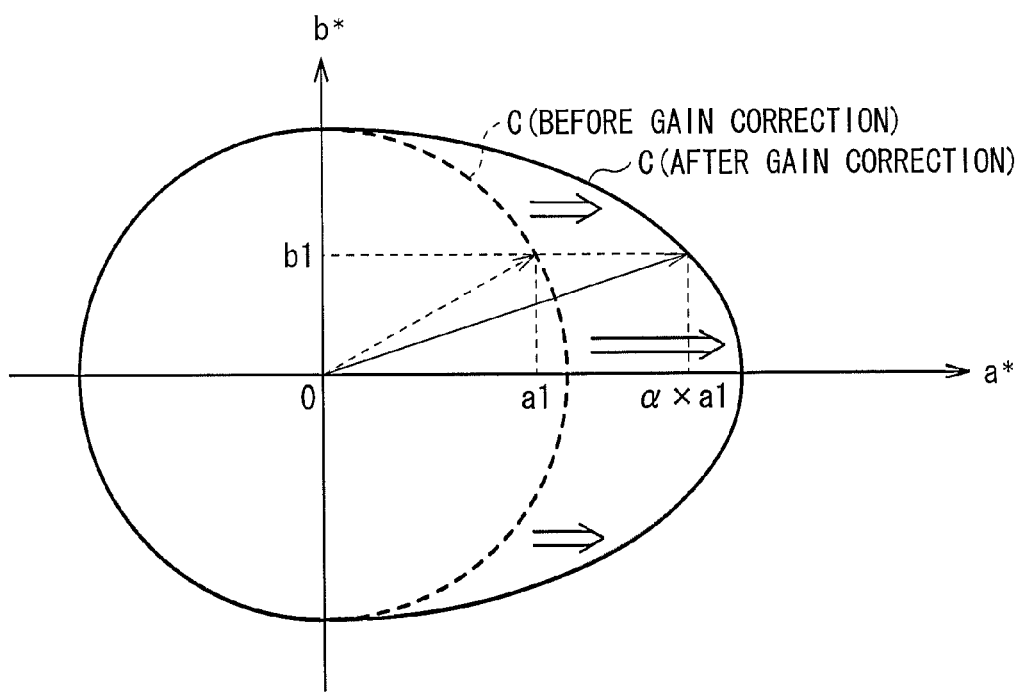
FIG. 3 is a characteristic diagram showing an example of a calculation method for chroma listed in FIG. 2.

Given a (a*, b*) coordinate system as shown in FIG. 3 for example, such a gain correction processing corresponds to conversion (correction) from a point of (a*, b*)=(a1, b1) into a point of (a*, b*)=(α×a1, b1). This results in a curve indicating the chroma C before and after the gain correction processing being just like as shown in FIG. 3. That is, a curve indicating the chroma C before the gain correction processing takes a circular form, whereas a curve indicating the chroma C after the gain correction processing takes an elliptical form instead of a circular form as shown with arrow marks in the figure in a region of a*>0.

It is due to the following reason that the chroma C is calculated after such a gain correction processing is completed. This is because the color unevenness visibility that a human perceives (color unevenness visibility) may vary depending on kinds of colors composing the color unevenness.

Figure 4A:
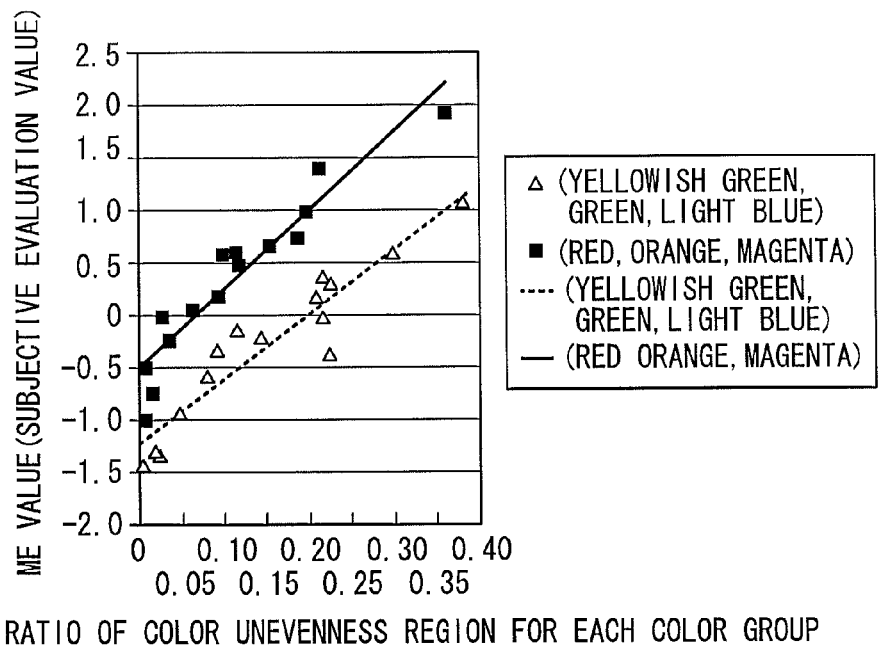
FIGS. 4A and 4B are characteristic diagrams showing examples of relationships between an area ratio of a color unevenness region for each color group and maximum chroma in a color unevenness region, and subjective evaluation values for the color unevenness, respectively.

In concrete terms, first, a difference in the color unevenness visibility (ME value; subjective evaluation value of a unevenness (color unevenness in this case) provided by a human) occurs depending on an area ratio of the color unevenness region for each color group (area ratio of a color unevenness region for each color group to a whole region targeted for inspection (whole display pixel region within the display screen)). In other words, as shown in FIG. 4A, for example, for each area ratio for color groups corresponding to red (R)-based, orange (O)-based, and magenta (M)-based colors, ME values (color unevenness visibility) at the same area ratio value become higher as compared with each area ratio for color groups corresponding to yellowish green (YG)-based, green (G)-based, and light blue (LB)-based colors.

Figure 4B:
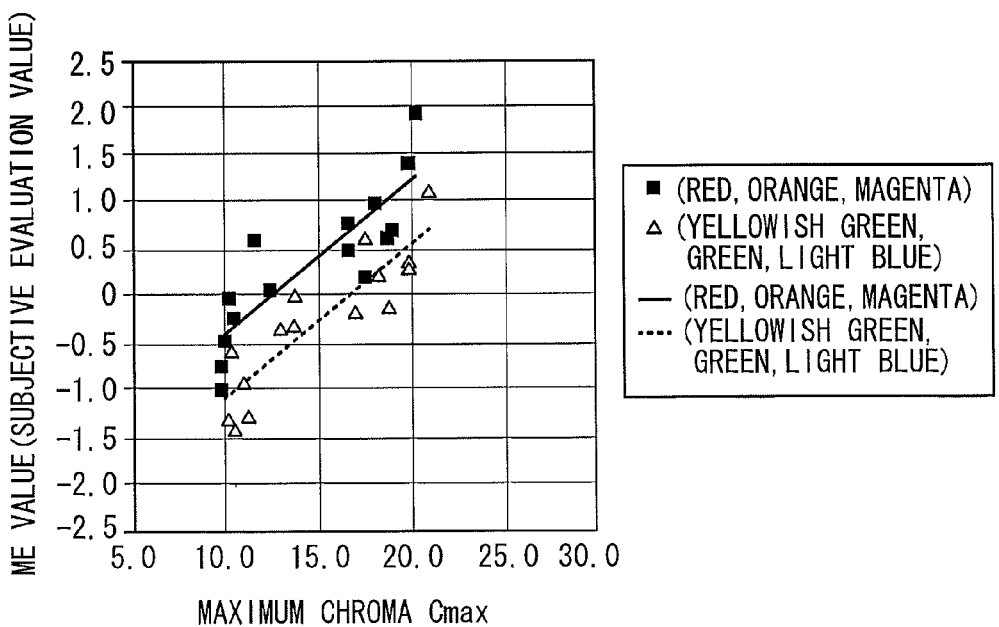

Further, a difference in the color unevenness visibility (ME value) occurs also depending on a color group to which a color exhibiting a maximum chroma Cmax (maximum chroma over a whole area of a color unevenness region) belongs. In other words, as shown in FIG. 4B, for example, when a color belonging to a color group corresponding to red (R)-based, orange (O)-based, and magenta (M)-based colors exhibits the maximum chroma Cmax, the ME value (color unevenness visibility) at the same maximum chroma Cmax value becomes higher as compared with a case where a color belonging to a color group corresponding to yellowish green (YG)-based, green (G)-based, and light blue (LB)-based colors exhibits the maximum chroma Cmax.

Therefore, according to this embodiment of the present disclosure, the image generating section 21 calculates the chroma C while performing a gain correction processing in consideration of a difference in the color unevenness visibility depending on colors. In concrete terms, for a region of a*>0 corresponding to color groups with the relatively higher color unevenness visibility (color groups corresponding to the red (R)-based, orange (O)-based, and magenta (M)-based colors), correction (gain correction) to selectively increase a value of a* is performed. As a result, unlike existing techniques carrying out unevenness inspection (color unevenness inspection) with disregard for a difference in the color unevenness visibility depending on colors, this achieves objective unevenness inspection that is more consistent with human perception.

Next, the image generating section 21 uses the chroma C calculated in the above-described manner to generate the color unevenness image (color unevenness image data D11) that is one of the color unevenness inspection images from the pickup image (step S114). That is, the image generating section 21 generates a color unevenness image composed of values of the chroma C for respective image pickup pixels. This generates the color unevenness image composed of the color unevenness image data D11 as shown in FIG. 5A, for example.

Subsequently, the image generating section 21 uses the calculated chroma C again to generate the chroma edge image (chroma edge image data D12) that is one of the color unevenness inspection images from the pickup image (step S115). In particular, a chroma edge region is identified by performing, for example, Sobel filtering and the like, thereby generating the chroma edge image. More specifically, a region exceeding a threshold (for example, (dC*/mm)=2.0) that is defined per a unit length on a display screen to be consistent with the color unevenness visibility perceived by a human is identified as the chroma edge region. This results in generation of the chroma edge image composed of the chroma edge image data D12 as shown in FIG. 5B, for example.

Figure 6A:
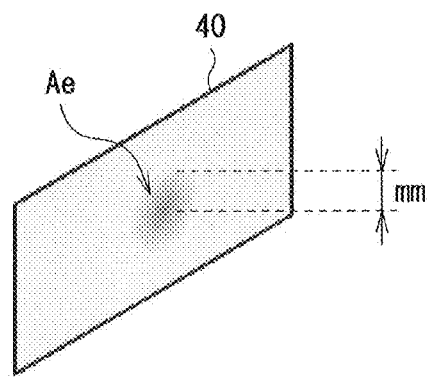
FIGS. 6A and 6B are schematic diagrams for explaining the definition of a chroma edge region and a luminance edge region.
Figure 6B:
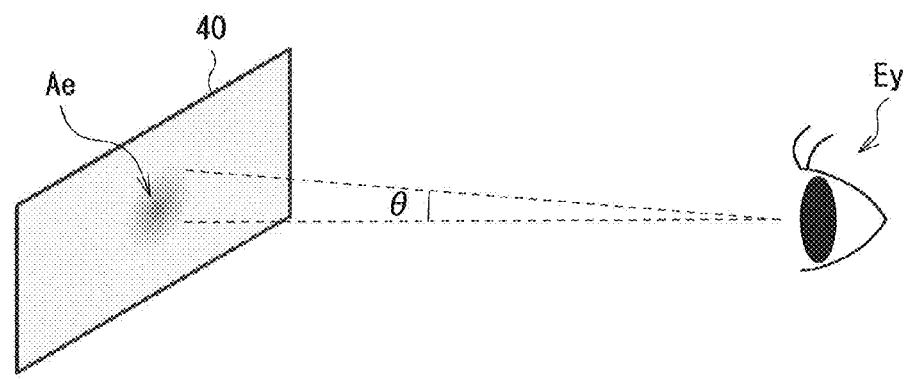

Here, the chroma edge region to be identified at this time is defined as, for example, a region where the amount of change in chroma (chroma edge intensity) per unit length in the test object (display screen) or the amount of change in chroma per unit viewing angle is equal to or larger than a predetermined threshold value (chroma edge threshold value). Specifically, for example, as shown in FIG. 6A, a region (for example, a region Ae in FIG. 6A) where the amount of change in chroma per unit length is equal to or larger than the chroma edge threshold value (for example, (dC*/mm)=2.0) determined per unit length on the display screen 40 to reflect the human visibility of color unevenness may be identified as the chroma edge region. Alternatively, for example, as shown in FIG. 6B, a region (for example, an region Ae in FIG. 6B) where the amount of change in chroma per unit viewing angle is equal to or larger than the predetermined threshold value (for example, (dC*/arc min) =0.873) determined per unit viewing angle θ of a viewer (an eye Ey) to reflect the human visibility of color unevenness may be identified as the chroma edge region. Here, it is desirable to use the viewing angle θ defined as follows, for example. That is, when the eyesight of a person is 1.0, resolution in angle recognizable by the person is determined as 1 minute which is 1/60 of 1 degree. Therefore, considering such human visual perception properties, the viewing angle θ is desirably defined in minutes. This is applicable through the description below. However, the definition of the viewing angle θ is not limited to this definition.

Thereafter, the image generating section 21 uses the generated color unevenness image (color unevenness image data D11) to further generate a binary color unevenness image (binary color unevenness image data D13), identifying a color unevenness region (step S116). At this time, a color unevenness region is identified based on a magnitude of the chroma C in each image pickup pixel. In concrete terms, the image pickup pixel whose value of the chroma C exceeds the predetermined threshold (for example, 2.0) is determined as the image pickup pixel belonging to the color unevenness region, whereas the image pickup pixel whose value of the chroma C is less than the predetermined threshold is determined as the image pickup pixel not belonging to the color unevenness region, thereby identifying the color unevenness region. This results in identification of the color unevenness region like the binary color unevenness image (binary color unevenness image data D13) as shown in FIG. 5C, for example. It is to be noted that, on the binary color unevenness image shown in FIG. 5C, a color unevenness region is displayed in red, and any other regions are displayed in black (representing a binary image).

Next, the parameter calculating section 22 uses various color unevenness inspection images (color unevenness image data D11, chroma edge image data D12, and binary color unevenness image data D13) that are generated as described above to calculate various parameters to be described hereinafter (step S117).

In particular, the parameter calculating section 22 uses the chroma edge image (chroma edge image data D12) to calculate a chroma edge area ratio Sce that is an area ratio of a chroma edge region to a whole region targeted for inspection (whole display pixel region within the display screen).

Further, the parameter calculating section 22 uses the binary color unevenness image (binary color unevenness image data D13) to calculate a color unevenness area ratio Sc that is an area ratio of the color unevenness region to the whole region targeted for inspection (whole display pixel region within the display screen).

In addition, the parameter calculating section 22 uses the color unevenness image (color unevenness image data D11) to calculate the maximum chroma Cmax over the whole area of the color unevenness region. In an example of the color unevenness image shown in FIG. 5A, the maximum chroma Cmax is shown in the image pickup pixel indicated with a "X" mark in FIG. 5D.

Subsequently, the parameter calculating section 22 calculates the color unevenness evaluation value Ec by performing a weighting addition of the chroma edge area ratio Sce, the color unevenness area ratio Sc, and the maximum chroma Cmax that are calculated in the above-described manner (step S118). In concrete terms, the parameter calculating section 22 calculates the color unevenness evaluation value Ec by using, for example, Expression (6) given below. It is to be noted that, in Expression (6), constants (coefficients) k1, k2, and k3 denote weighting coefficients respectively, and c1 denotes a predefined constant (including 0 (zero)).

$$Ec = k1 \times Sce + k2 \times Sc + k3 \times Cmax + c1 \quad (6)$$

(2-3. Calculation of Luminance Unevenness Evaluation Value El)

Further, the image generating section 21 and the parameter calculating section 22 calculate the luminance unevenness evaluation value El in the manner to be hereinafter described (steps S121 to S127).

In concrete terms, first, the image generating section 21 calculates L* (luminosity) that is a value in the above-described CIE 1976 L*a*b* color space (CIELAB color space) on the basis of the (Xi, Yi, Zi) signal after being subject to the above-described noise removing process (step S121). In particular, the image generating section 21 calculates L* for each image pickup pixel by using Expression (7) given below.

$$L^* = 116(Y_i/Y_n)^{1/3} - 16 \quad (7)$$

Thereafter, the image generating section 21 calculates average luminance L*ave that is an average value of L* in a whole region of a white-color image (whole display pixel region of the white-color image displayed on the display screen of the display unit 4 in this case) (step S122).

Next, the image generating section 21 uses L* and the average luminance L*ave that are calculated in the above-described manner to generate the luminance unevenness image (luminance unevenness image data D21) that is one of the luminance unevenness inspection images from the pickup images (step S123). In concrete terms, the image generating section 21 calculates, for each image pickup pixel, a luminance difference Δ L* (=L*-L*ave) that is a difference value obtained by subtracting the average luminance L*ave from L* in each image pickup pixel, thereby generating the luminance unevenness image composed of the resulting luminance difference Δ L*. This generates the luminance unevenness image composed of the luminance unevenness image data D21 as shown in FIG. 7A, for example. It is to be noted that, at this time, the luminance unevenness image may be generated using the value of L* instead of generating the luminance unevenness image using the luminance difference Δ L* as described above.

Subsequently, the image generating section 21 uses the calculated value of L* again to generate the luminance edge image (luminance edge image data D22) that is one of the luminance unevenness inspection images from the pickup image (step S124). In particular, a luminance edge region is identified by performing, for example, Sobel filtering and the like, thereby generating the luminance edge image. More specifically, a region exceeding a threshold (for example, (dL*/mm)=0.5) that is defined per a unit length on the display screen to be consistent with the color unevenness visibility perceived by a human is identified as the luminance edge region. This results in generation of the luminance edge image composed of the luminance edge image data D22 as shown in FIG. 7B, for example.

Here, the luminance edge region to be identified at this time is defined as, for example, a region where the amount of change in luminance (luminance edge intensity) per unit length in the test object (display screen) or the amount of change in luminance per unit viewing angle is equal to or larger than a predetermined threshold value (luminance edge threshold value). Specifically, for example, as shown in FIG. 6A, a region (for example, the region Ae in FIG. 6A) where the amount of change in luminance per unit length is equal to or larger than the luminance edge threshold value (for example, (dL*/mm)=0.5) determined per unit length on the display screen 40 may be identified as the luminance edge region. Alternatively, for example, as shown in FIG. 6B, a region (for example, the region Ae in FIG. 6B) where the amount of change in luminance per unit viewing angle is equal to or larger than the predetermined threshold value (for example, (dL*/arc min)=0.218) determined per unit viewing angle θ of a viewer (an eye Ey) may be identified as the luminance edge region.

Thereafter, the image generating section 21 uses the generated luminance unevenness image (luminance unevenness image data D21) to further generate the binary luminance unevenness image (binary luminance unevenness image data D23), identifying a luminance unevenness region (light and dark region) (step S125). At this time, the luminance unevenness region is identified based on a magnitude of the luminance difference $\Delta L^*$ in each image pickup pixel. In concrete terms, the image pickup pixel whose value of the luminance difference $\Delta L^*$ exceeds a predetermined threshold (for example, 0.3) is determined as the image pickup pixel belonging to the luminance unevenness region, whereas the image pickup pixel whose value of the luminance difference $\Delta L^*$ is less than the predetermined threshold is determined as the image pickup pixel not belonging to the luminance unevenness region, thereby identifying the luminance unevenness region. This results in identification of the luminance unevenness region being identified like the binary luminance unevenness image (binary luminance unevenness image data D23) as shown in FIG. 7C, for example. It is to be noted that on the binary luminance unevenness image shown in FIG. 7C, the luminance unevenness region is displayed in white, and any other region is displayed in black (representing a binary image).

Next, the parameter calculating section 22 uses various luminance unevenness inspection images (luminance unevenness image data D21, luminance edge image data D22, and binary luminance unevenness image data D23) that are generated as described above to calculate various parameters to be described hereinafter (step S126).

In particular, the parameter calculating section 22 uses the luminance edge image (luminance edge image data D22) to calculate a luminance edge area ratio Sle that is an area ratio of the luminance edge region to the whole region targeted for inspection (whole display pixel region within the display screen).

Further, the parameter calculating section 22 uses the binary luminance unevenness image (binary luminance unevenness image data D23) to calculate a luminance unevenness area ratio Sl that is an area ratio of the luminance unevenness region to the whole region targeted for inspection (whole display pixel region within the display screen).

In addition, the parameter calculating section 22 uses the luminance unevenness image (luminance unevenness image data D21) to calculate the maximum luminance difference $\Delta L^*$max (=L*max−L*ave) that is a difference value obtained by subtracting the average luminance L*ave from the maximum luminance (maximum value of L*:L*max) over the whole area of the luminance unevenness region. In an example of the luminance unevenness image shown in FIG. 7A, the maximum luminance difference $\Delta L^*$max is shown in the image pickup pixel indicated with a "X" mark in FIG. 7D.

Subsequently, the parameter calculating section 22 calculates the luminance unevenness evaluation value El by performing weighting addition of the luminance edge area ratio Sle, the luminance unevenness area ratio Sl, and the maximum luminance difference $\Delta L^*$max that are calculated in the above-described manner (step S127). In concrete terms, the parameter calculating section 22 calculates the luminance unevenness evaluation value El by using, for example, Expression (8) given below. It is to be noted that, in Expression (8), constants (coefficients) k4, k5, and k6 denote weighting coefficients respectively, and c2 denotes a predefined constant (including 0 (zero)).

$$El=k4\times Sle+k5\times Sl+k6\times \Delta L^*\max+c2 \qquad (8)$$

(2-4. Calculation of Total Evaluation Value E and Unevenness Inspection Processing)

Thereafter, the parameter calculating section 22 calculates the total evaluation value E for the unevenness inspection by using, for example, Expression (9) given below on the basis of the color unevenness evaluation value Ec and the luminance unevenness evaluation value El that are obtained in the above-described manner (step S131). That is, the parameter calculating section 22 calculates the total evaluation value E by performing weighting addition of the color unevenness evaluation value Ec and the luminance unevenness evaluation value El. This makes it possible to carry out inspection that reflects the weighting of the color unevenness evaluation value Ec and the luminance unevenness evaluation value El in unevenness inspection to be hereinafter described. It is to be noted that, in Expression (9), constants (coefficients) A and B denote weighting coefficients respectively, and c3 denotes a predefined constant (including 0).

$$E=A\times Ec+B\times El+c3 \qquad (9)$$

Here, according to this embodiment of the present disclosure, the parameter calculating section 22 calculates the total evaluation value E in consideration of the unevenness visibility for both of the color and the luminance. In concrete terms, each of the above-described weighting coefficients A and B is determined in consideration of the unevenness visibility for both of the color and the luminance. In such a manner, a calculation is made in consideration of the unevenness visibility for both of the color and the luminance in calculating the total evaluation value E, thereby making it possible to achieve objective unevenness inspection that is more consistent with human perception as compared with existing techniques carrying out unevenness inspection with disregard for such an visibility.

Afterward, the inspection processing section 23 uses the total evaluation value E obtained in the above-described manner to perform unevenness inspection for the display screen of the display unit 4 that is targeted for inspection, generating the inspection result data Dout as its inspection result (step S132). In particular, for example, it is determined that a degree of the unevenness (one or both of the color unevenness and the luminance unevenness) in a test object becomes greater as the total evaluation value E increases. On the other hand, it is determined that the degree of the unevenness in the test object becomes smaller as the total evaluation value E decreases. Or, the test object is determined to be a defective product when the total evaluation value E is equal to or larger than a predefined threshold, while the test object is determined to be a non defective product when the total evaluation value E is less than the predefined threshold. Such a step completes a unevenness inspection processing to be performed by the image processing unit 2.

Example 1

Figure 8A:
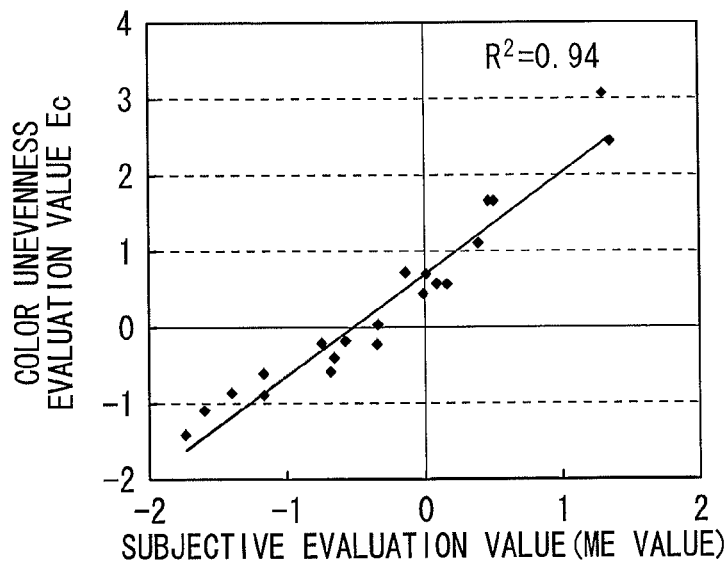
FIGS. 8A, 8B, and 8C are characteristic diagrams showing a relationship between various subjective evaluation values and various unevenness evaluation values according to Example 1.
Figure 8B:
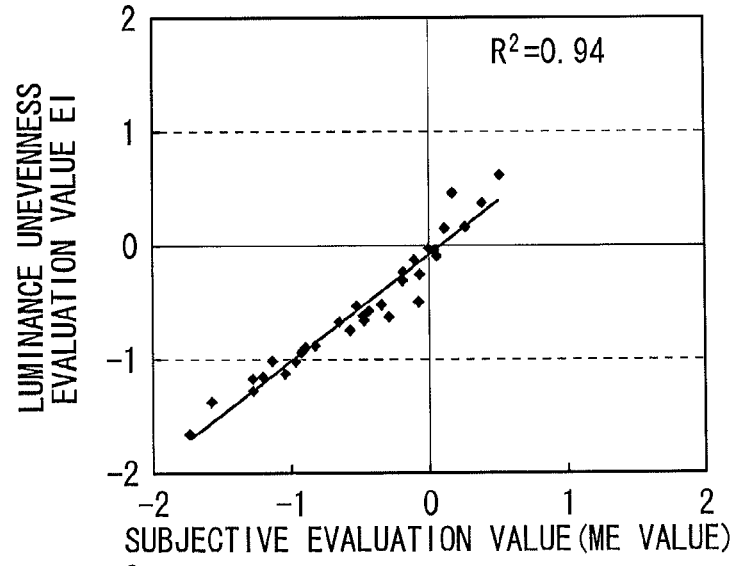
Figure 8C:
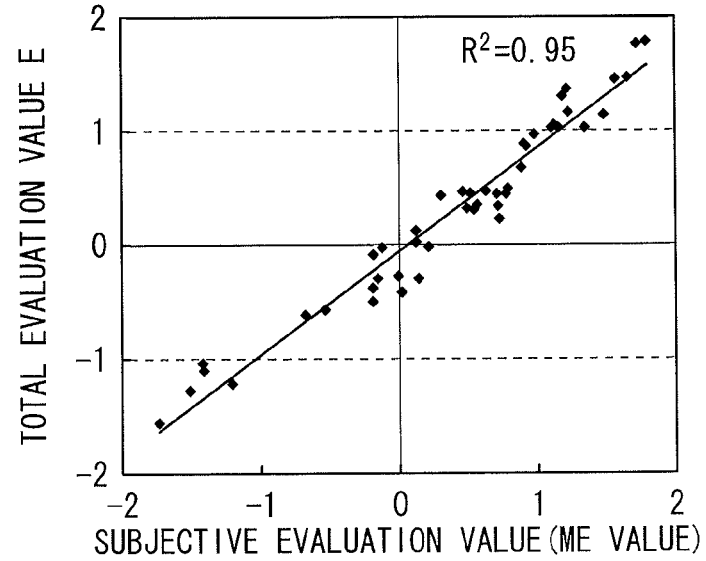

FIGS. 8A, 8B, and 8C illustrate an Example (Example 1) showing relations (correlations) between various evaluation values described hitherto and subjective evaluation values (ME values) evaluated by a human. In concrete terms, FIG. 8A illustrates a correlation between the color unevenness evaluation value Ec and the subjective evaluation value (ME value) according to Example 1, and FIG. 8B illustrates a correlation between the luminance unevenness evaluation value El and the subjective evaluation value (ME value) according to Example 1, while FIG. 8C illustrates a correlation between the total unevenness evaluation value E and the subjective evaluation value (ME value) according to Example 1. It is to be noted that a determination coefficient $R^2$ in a linear line that is shown in these figures denotes that the unevenness inspection accuracy is enhanced as a value of $R^2$ becomes a greater value closer to "1".

First, an example illustrated in FIG. 8A is based on an evaluation result by the use of a magnitude estimation method for twenty-five persons of men and women in the age range from nineteen to twenty four as test subjects for the subjective evaluation. Further, in this example, the color unevenness evaluation value Ec is calculated with the weighting coefficient k1 of 12.8 for the chroma edge area ratio Sce, the weighting coefficient k2 of 4.0 for the color unevenness area ratio Sc, and the weighting coefficient k3 of 0.02 for the maximum chroma Cmax. In this example, it is found that the determination coefficient $R^2$ is equal to 0.94, which indicates a quite high correlation.

Meanwhile, an example illustrated in FIG. 8B is based on an evaluation result by the use of the magnitude estimation method under a similar condition to the case of FIG. 8A. Further, in this example, the luminance unevenness evaluation value El is calculated with the weighting coefficient k4 of 19.9 for the luminance edge area ratio Sle, the weighting coefficient k5 of 1.9 for the luminance unevenness area ratio Sl, and the weighting coefficient k6 of 0.19 for the maximum luminance difference Δ L*max. In this example, it is also found that the determination coefficient $R^2$ is equal to 0.94, which indicates a quite high correlation.

On the other hand, an example illustrated in FIG. 8C is also based on an evaluation result by the use of the magnitude estimation method under a similar condition to the case of FIG. 8A. Further, in this example, the total evaluation value E is calculated with the weighting coefficient A of 0.63 for the color unevenness evaluation value Ec and the weighting coefficient B of 0.71 for the luminance unevenness evaluation value El. In this example, it is also found that the determination coefficient $R^2$ is equal to 0.95, which indicates a quite high correlation.

Example 2

Figures 9A, 9B:
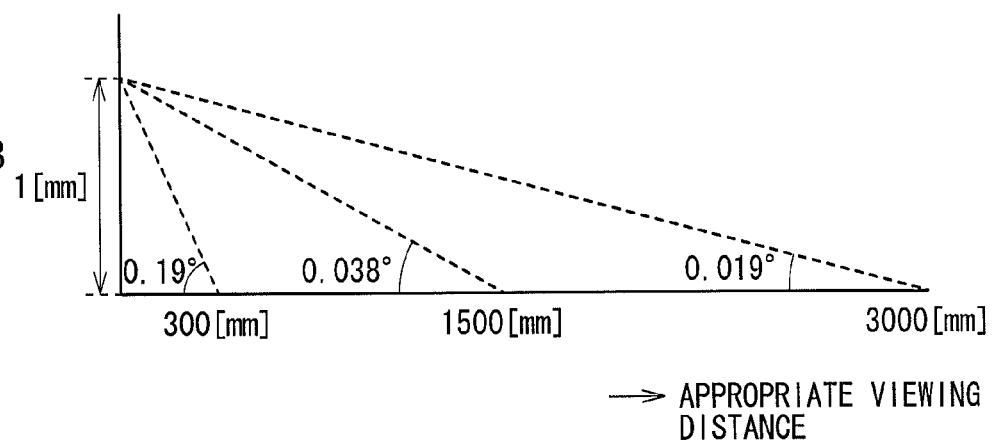
FIGS. 9A and 9B are diagrams for explaining evaluation conditions according to Example 2.

FIGS. 9A, 9B, and 10 illustrate an Example (Example 2) showing the difference between edge regions when an edge region (luminance edge region) is identified by comparing the above-described amount of change per unit length or amount of change per unit viewing angle with the predetermined edge threshold value.

Specifically, FIG. 9A shows the relation between the size [inch] of the display screen targeted for inspection, and appropriate viewing distance [mm] for a viewer and a viewing angle [°] per 1 mm for each size (8, 40, 80 inches). FIG. 9B schematically illustrates the relation between each of the appropriate viewing distances and the viewing angle per 1 mm shown in FIG. 9A.

On the other hand, FIG. 10 compares, for each of the appropriate viewing distances (each of the display screen sizes) shown in FIGS. 9A and 9B, the luminance edge image (luminance edge image data D22) in the case where (dL*/mm)=0.5 described above is used as the luminance edge threshold value and the luminance edge image in the case where (dL*/arc min)=0.218 described above is used. Namely, FIG. 10 illustrates, by comparison, the difference in the identified edge region between the case where the amount of change in luminance (luminance edge intensity) per unit length in the display screen is used to define the luminance edge region and the case where the amount of change in luminance per unit viewing angle is used to define the luminance edge region.

According to Example 2 shown in FIGS. 9A, 9B, and 10, in the case where the amount of change in luminance per unit viewing angle is used to define the luminance edge region (the case of luminance edge threshold value: (dL*/arc min)=0.218), it seems that the following effect is also obtained. That is, the luminance edge region is allowed to be invariably identified independent of the display screen size (appropriate viewing distance for the viewer), unlike the case where the amount of change in luminance per unit length in the display screen (the case of luminance edge threshold value: (dL*/mm)=0.5) is used to define the luminance edge region. Accordingly, the accuracy of the unevenness inspection is allowed to be improved.

In Example 2, the description has been given of the difference between the edge regions in identifying the luminance edge region. However, this is similarly applicable to the difference between the edge regions in identifying the chroma edge region. That is, in the case where the amount of change in chroma per unit viewing angle is used to define the chroma edge region, the chroma edge region is allowed to be invariably identified independent of the display screen size (appropriate viewing distance for the viewer), unlike the case where the amount of change in chroma per unit length in the display screen is used to define the luminance edge region.

As described above, according to this embodiment of the present disclosure, in calculating the total evaluation value E using both of the color unevenness inspection images (various image data D11 to D13) and the luminance unevenness inspection images (various image data D21 to D23), calculation is made in consideration of the unevenness visibility for both of the color and the luminance. As a result, unlike existing techniques, this allows to achieve objective unevenness inspection (comprehensive unevenness inspection including the color unevenness inspection and the luminance unevenness inspection) that is more consistent with human perception. Consequently, it is possible to carry out more appropriate unevenness inspection as compared with existing techniques.

Further, in generating the color unevenness inspection images, the chroma C is calculated while performing the correction processing (gain correction processing for a*) in consideration of the difference in the color unevenness visibility depending on colors in each image pickup pixel of the pickup image. This makes it possible to achieve objective unevenness inspection that is further consistent with human perception, which allows that more appropriate unevenness inspection to be carried out.

Moreover, because an objective unevenness inspection that is more consistent with human perception is achieved, it is possible to improve the efficiency of development and design activities by using such unevenness inspection for the quality evaluation during the development and design stages.

In addition, when the unevenness inspection according to this embodiment of the present disclosure is adopted in inspection processes for a mass-production of a product, it is possible to perform a stable and rapid unevenness inspection, which allows the efficiency of the inspection processes to be improved, and the product quality to be stabilized.

In addition, in the embodiments, the amount of change (the amount of change in luminance and that in chroma) per unit viewing angle is used to define the edge region (the luminance edge region and the chroma edge region). Therefore, even a small edge region on the display screen is allowed to be identified as described below. Specifically, for example, as shown in FIG. 11, in the case where the difference in luminance, chroma, or the like between pixels separated with a pitch corresponding to the viewing angle of, for example, 0.1 [rad] or more is used to identify the edge region, for example, when the display screen size is as large as 40 [inch] or 80 [inch], a small edge region is not allowed to be identified. This is because, as shown in FIG. 11, the pitch on the display screen corresponding to the viewing angle of 0.1 [rad] becomes as large as several hundred [mm] In contrast, in the case where the amount of change per unit viewing angle is used to define the edge region, for example, when the unit viewing angle is 1 ['] as shown in FIG. 11, the pitch on the display screen corresponding to this unit viewing angle is kept to be less than 1 [mm] even if the display screen size is large. Thus, even considering, for example, the case where the display screen size is large, the case where the high-definition portable display is seen with an appropriate viewing distance, or the like, a small edge region is allowed to be identified, and thereby, the accuracy of the unevenness inspection is allowed to be improved.

In the above description, the amount of change per unit viewing angle is used to define the edge region. However, alternately, the threshold value (edge threshold value) of the amount of change (the amount of change in luminance and that in chroma) per unit length in the display screen according to the viewing distance may be changed to define the edge region. Specifically, the luminance edge threshold value and the chroma edge threshold value may be determined using the expressions (10) and (11) below, for example. It is to be noted that, in these expressions, D represents the viewing distance [mm], Lth (=0.5) represents the luminance edge threshold value per unit length when D=1500 [mm], and Cth (=2.0) represents the chroma edge threshold value per unit length when D=1500 [mm] Thus, also in the case where the edge threshold value per unit length is changed according to the viewing distance to define the edge region, a small edge region is allowed to be identified, and thereby, the accuracy of the unevenness inspection is allowed to be improved as the case where the amount of change per unit viewing angle is used to define the edge region.

$$\text{Luminance edge threshold value: } (dL^*/dx) = L\text{th} \times (1500/D) \quad (10)$$

$$\text{Chroma edge threshold value: } (dC^*/dx) = C\text{th} \times (1500/D) \quad (11)$$

Modification Example

The present technology is described hitherto by citing the embodiment, although the present technology is not limited to this embodiment of the present disclosure, and different variations may be made.

For example, in the above-described embodiment of the present disclosure, the case where three parameters including the chroma edge area ratio Sce, the color unevenness area ratio Sc, and the maximum chroma Cmax are used as the color unevenness evaluation value Ec is described, although other parameters may be used in addition to (or instead of) these parameters. Moreover, one or more of these three parameters may be used as the color unevenness evaluation value Ec. However, it is preferable that at least two parameters of the chroma edge area ratio Sce and the color unevenness area ratio Sc among these three parameters be used especially. This is because a human tends to take particular note of a spatial spreading in judging a degree of the color unevenness, and thus these two parameters have a relatively greater contribution to the color unevenness evaluation value Ec.

Further, in the above-described embodiment of the present disclosure, the case where three parameters including the luminance edge area ratio Sle, the luminance unevenness area ratio Sl, and the maximum luminance difference Δ L*max are used as the luminance unevenness evaluation value El is described, although other parameters may be used in addition to (or instead of) these parameters. Moreover, one or more of these three parameters may be used as the luminance unevenness evaluation value El. However, it is preferable that at least two parameters of the luminance edge area ratio Sle and the luminance unevenness area ratio Sl among these three parameters be used especially. This is because a human tends to take particular note of a spatial spreading in judging the degree of the luminance unevenness, and thus these two parameters have a relatively greater contribution to the luminance unevenness evaluation value El.

Moreover, in the above-described embodiment of the present disclosure, descriptions are provided by specifically citing the examples of the color unevenness inspection image and the luminance unevenness inspection image. However, the color unevenness inspection image and the luminance unevenness inspection image are not limited to those images cited in the above-described embodiment of the present disclosure.

In addition, in the above-described embodiment of the present disclosure, the description is provided on the case where, in generating the color unevenness inspection image, the chroma C is calculated while performing the correction processing (gain correction processing) in consideration of the difference in the color unevenness visibility depending on colors, although such a gain correction processing may be omitted in some instances.

Further, in the above-described embodiment of the present disclosure, the description is provided on the case where the test object for the unevenness inspection is the display screen of the display unit for performing color image display, although the test object for the present technology may be an unit other than the display unit (for example, a lighting unit (such as a backlight) capable of color light emission) alternatively.

Additionally, in the above-described embodiment of the present disclosure, the description is provided on the case where the image pickup unit 3 and the image processing unit 2 are separated in the unevenness inspection apparatus 1, although these units may be mounted integrally within a same apparatus.

Moreover, a series of processes explained in the above-described embodiment of the present disclosure may be performed with hardware (circuits), or may be executed with software (programs).

It is possible to achieve at least the following configurations from the above-described example embodiments and the modifications of the disclosure.

(1) An unevenness inspection apparatus including:
an image pickup section obtaining a pickup image of a test object;
an image generating section generating each of a color unevenness inspection image and a luminance unevenness inspection image based on the pickup image;
a calculating section calculating an evaluation parameter using both of the color unevenness inspection image and the luminance unevenness inspection image; and
an inspecting section performing unevenness inspection using the calculated evaluation parameter,
wherein the calculating section calculates the evaluation parameter in consideration of unevenness visibility for both color and luminance.

(2) The unevenness inspection apparatus according to (1), wherein the calculating section calculates a color unevenness evaluation parameter using the color unevenness inspection image and calculates a luminance unevenness evaluation parameter using the luminance unevenness inspection image; and
the calculating section calculates a total evaluation parameter as the evaluation parameter by performing weighting addition of the color unevenness evaluation parameter and the luminance unevenness evaluation parameter.

(3) The unevenness inspection apparatus according to (2), wherein, when the color unevenness evaluation parameter is Ec, the luminance unevenness evaluation parameter is El, and weighting coefficients are A and B, the total evaluation parameter E is given by Expression (1) given below, and each of the weighting coefficients A and B is determined in consideration of the unevenness visibility.

$$E = A \times Ec + B \times El \quad (1)$$

(4) The unevenness inspection apparatus according to (2) or (3), wherein the inspecting section determines that a degree of unevenness in the test object is greater as the total evaluation parameter increases, and
the inspecting section determines that the degree of unevenness in the test object is smaller as the total evaluation parameter decreases.

(5) The unevenness inspection apparatus according to any one of (1) to (4), wherein the image generating section generates the color unevenness inspection image while performing correction processing in consideration of a difference in color unevenness visibility depending on colors.

(6) The unevenness inspection apparatus according to (5), wherein the image generating section calculates chroma while performing the correction processing in each unit region of the pickup image, and uses the calculated chroma to generate the color unevenness inspection image.

(7) The unevenness inspection apparatus according to (6), wherein the image generating section calculates (a*, b*) in CIELAB color space in each unit region of the pickup image, and
the image generating section performs, on the calculated a*, a gain correction processing expressed by Expression (2) given below as the correction processing, and then, calculates chroma C using Expression (3) given below.

$$a^{*\prime} = (\alpha \times a^*)$$

$$(\text{For } a^* > 0: \text{ gain } \alpha > 1; \text{ for } a^* = <0: \text{ gain } \alpha = 1) \quad (2)$$

$$C = \{(a^{*\prime})^2 + (b^*)^2\}^{1/2} \quad (3)$$

(8) The unevenness inspection apparatus according to any one of (2) to (7), wherein a chroma edge area ratio and a color unevenness area ratio are used as the color unevenness evaluation parameter, the chroma edge area ratio being an area ratio of a chroma edge region to a whole region of the test object, the color unevenness area ratio being an area ratio of a color unevenness region to the whole region of the test object.

(9) The unevenness inspection apparatus according to (8), wherein the chroma edge area ratio, the color unevenness area ratio, and maximum chroma in the whole color unevenness region are used as the color unevenness evaluation parameter.

(10) The unevenness inspection apparatus according to (9), wherein the calculating section calculates each of the chroma edge area ratio, the color unevenness area ratio, and the maximum chroma using the color unevenness inspection image, and
the calculating section calculates the color unevenness evaluation parameter by performing weighting addition of the chroma edge area ratio, the color unevenness area ratio, and the maximum chroma.

(11) The unevenness inspection apparatus according to any one of (8) to (10), wherein the chroma edge region is a region in which amount of change in chroma per unit length in the test object or unit viewing angle is equal to or larger than a predetermined threshold value.

(12) The unevenness inspection apparatus according to any one of (2) to (11), wherein a luminance edge area ratio and a luminance unevenness area ratio are used as the luminance unevenness evaluation parameter, the luminance edge area ratio being an area ratio of a luminance edge region to a whole region of the test object, the luminance unevenness area ratio being an area ratio of a luminance unevenness region to the whole region of the test object.

(13) The unevenness inspection apparatus according to (12), wherein the luminance edge area ratio, the luminance unevenness area ratio, and a maximum luminance difference are used as the luminance unevenness evaluation parameter, the maximum luminance difference being a difference value between maximum luminance in the whole luminance unevenness region and an average luminance in a white-color image.

(14) The unevenness inspection apparatus according to (13), wherein the calculating section calculates each of the luminance edge area ratio, the luminance unevenness area ratio, and the maximum luminance difference using the luminance unevenness inspection image, and
the calculating section calculates the luminance unevenness evaluation parameter by performing weighting addition of the luminance edge area ratio, the luminance unevenness area ratio, and the maximum luminance difference.

(15) The unevenness inspection apparatus according to any one of (12) to (14), wherein the luminance edge region is a region in which amount of change in luminance per unit length in the test object or unit viewing angle is equal to or larger than a predetermined threshold value.

(16) The unevenness inspection apparatus according to any one of (1) to (15), wherein the test object is a display screen of a display unit performing color image display.

(17) An unevenness inspection method including:
obtaining a pickup image of a test object;
generating each of a color unevenness inspection image and a luminance unevenness inspection image based on the pickup image;
calculating an evaluation parameter using both of the color unevenness inspection image and the luminance unevenness inspection image; and
performing unevenness inspection using the calculated evaluation parameter,
wherein the calculating the evaluation parameter is performed in consideration of unevenness visibility for both color and luminance.

It should be understood by those skilled in the art that various modifications, combinations, sub-combinations and alterations may occur depending on design requirements and other factors insofar as they are within the scope of the appended claims or the equivalents thereof.

What is claimed is:

1. An unevenness inspection apparatus comprising:
circuitry configured to:
obtain a pickup image of a test object;
modify a chroma value of a pixel in the pickup image to correct a gain of the pickup image based on a color group associated with the pixel for generating a color unevenness inspection image;
generate a luminance unevenness inspection image based on the pickup image;
calculate an evaluation parameter using both of the color unevenness inspection image and the luminance unevenness inspection image; and
perform unevenness inspection using the calculated evaluation parameter,
wherein
the evaluation parameter is calculated based on unevenness visibility of both color and luminance.

2. The unevenness inspection apparatus according to claim 1, wherein the circuitry is further configured to:
calculate a color unevenness evaluation parameter using the color unevenness inspection image and calculate a luminance unevenness evaluation parameter using the luminance unevenness inspection image, and
calculate a total evaluation parameter as the evaluation parameter by performing weighting addition of the color unevenness evaluation parameter and the luminance unevenness evaluation parameter.

3. The unevenness inspection apparatus according to claim 2, wherein, when the color unevenness evaluation parameter is Ec, the luminance unevenness evaluation parameter is El, and weighting coefficients are A and B, the total evaluation parameter E is given by Expression (1) given below, and each of the weighting coefficients A and B is determined in consideration of the unevenness visibility $$E = A \times Ec + B \times El \qquad (1).$$

4. The unevenness inspection apparatus according to claim 2,
wherein a chroma edge area ratio and a color unevenness area ratio are used as the color unevenness evaluation parameter, the chroma edge area ratio being an area ratio of a chroma edge region to a whole region of the test object, the color unevenness area ratio being an area ratio of a color unevenness region to the whole region of the test object.

5. The unevenness inspection apparatus according to claim 4,
wherein the chroma edge area ratio, the color unevenness area ratio, and maximum chroma in whole of the color unevenness region are used as the color unevenness evaluation parameter.

6. The unevenness inspection apparatus according to claim 5, wherein the circuitry is further configured to:
calculate each of the chroma edge area ratio, the color unevenness area ratio, and the maximum chroma using the color unevenness inspection image, and
calculate the color unevenness evaluation parameter by performing weighting addition of the chroma edge area ratio, the color unevenness area ratio, and the maximum chroma.

7. The unevenness inspection apparatus according to claim 4,
wherein the chroma edge region is a region in which amount of change in chroma per unit length in the test object or unit viewing angle is equal to or larger than a predetermined threshold value.

8. An unevenness inspection apparatus comprising:
circuitry configured to:
modify a chroma value of a pixel in a pickup image to correct a gain of the pickup image based on a color group associated with the pixel for generating a color unevenness inspection image;
generate the color unevenness inspection image and a luminance unevenness inspection image based on the pickup image;
generate a color unevenness evaluation parameter based on the color unevenness inspection image;
generate a luminance unevenness evaluation parameter based on the luminance unevenness inspection image;
calculate weight coefficients for weighted addition in consideration of unevenness visibility for both color and luminance;
calculate an evaluation parameter by performing the weighted addition of the color unevenness evaluation parameter and the luminance unevenness evaluation parameter; and
perform unevenness inspection using the calculated evaluation parameter.

9. An unevenness inspection apparatus comprising:
circuitry configured to:
obtain a pickup image of a test object;
generate each of a color unevenness inspection image and a luminance unevenness inspection image based on the pickup image;
calculate an evaluation parameter using both of the color unevenness inspection image and the luminance unevenness inspection image; and
perform unevenness inspection using the calculated evaluation parameter, wherein
the evaluation parameter is calculated based on unevenness visibility of both color and luminance,
the calculation includes calculating a color unevenness evaluation parameter using the color unevenness inspection image and calculating a luminance unevenness evaluation parameter using the luminance unevenness inspection image,
the calculation further includes calculating a total evaluation parameter as the evaluation parameter by performing weighting addition of the color unevenness evaluation parameter and the luminance unevenness evaluation parameter, and
a chroma edge area ratio and a color unevenness area ratio are used as the color unevenness evaluation parameter, the chroma edge area ratio being an area ratio of a chroma edge region to a whole region of the test object, the color unevenness area ratio being an area ratio of a color unevenness region to the whole region of the test object.

10. The unevenness inspection apparatus of claim 1, wherein the gain correction is performed by selectively increasing a color component of the color group.

11. The unevenness inspection apparatus of claim 1, wherein the color group corresponds to at least a red (R)-based color group, an orange (O)-based color group, a magenta (M)-based color group, a yellowish green (YG)-based color group, a green (G)-based color group, and a light blue (LB)-based color group.

* * * * *